United States Patent [19]

Rau

[11] Patent Number: 4,893,084

[45] Date of Patent: Jan. 9, 1990

[54] FORMATION ELECTROMAGNETIC PARAMETERS MEASURING TOOL USING TRANSMITTER REFERENCE AND REFLECTED SIGNALS AND A RECEIVED SIGNAL

[75] Inventor: Rama N. Rau, League City, Tex.

[73] Assignee: Halliburton Logging Services, Inc., Houston, Tex.

[21] Appl. No.: 196,164

[22] Filed: May 19, 1988

[51] Int. Cl.$^4$ .......................... G01V 3/30; G01V 3/38
[52] U.S. Cl. ..................................... 324/341; 324/338
[58] Field of Search ............... 324/334, 337, 338, 339, 324/341

[56] References Cited

U.S. PATENT DOCUMENTS

| | | | |
|---|---|---|---|
| 4,052,662 | 10/1977 | Rau | 324/338 |
| 4,130,793 | 12/1978 | Bridges et al. | 324/341 |
| 4,338,567 | 7/1982 | Coates | 324/338 |
| 4,547,733 | 10/1985 | Thoraval | 324/341 X |
| 4,581,584 | 4/1986 | Baldwin | 324/338 |
| 4,712,070 | 12/1987 | Clark et al. | 324/338 |
| 4,766,384 | 8/1988 | Kleinberg et al. | 324/338 X |

Primary Examiner—Gerard R. Strecker
Attorney, Agent, or Firm—William J. Beard

[57] ABSTRACT

A method and apparatus for dielectric investigation in formations adjacent a well borehole is set forth. In the preferred and illustrated embodiment, a microwave transmitter forms and output signal which is transmitted by a transmitter antenna in contact with the sidewall, the propagation into the formation from the transmitter antenna, the signal being received at a receiving antenna, and further including means for making measurements of amplitude and phase angle. Such measurements are used to determine an equivalent circuit representative of the formation between the transmitter antenna and receiver antenna; the equivalent circuit encodes valuations of resistivity, dielectric constant and magnetic permeability of the formation material. Multiple measurements can be made in a given formation, and the sonde can be moved steadily or periodically to make measurements at selected locations. Formation electrical parameters in adjacent formations can then be determined.

17 Claims, 2 Drawing Sheets

FORMATION ELECTROMAGNETIC PARAMETERS MEASURING TOOL USING TRANSMITTER REFERENCE AND REFLECTED SIGNALS AND A RECEIVED SIGNAL

BACKGROUND OF THE DISCLOSURE

The present disclosure is directed to a method and apparatus involving a sonde supported transmitter and receiver system with antennas for determining dielectric measurements of formations along a well borehole. After a well has been drilled but before cementing of the well, it is important to make measurements along the borehole to determine properties of the formations penetrated by the well. Important information can be obtained by measuring formation resistivity and the dielectric constant of the materials that make up the formation. One aspect of the present apparatus is a system for measuring dielectric constant. The dielectric of space serves as a reference of 1.00. The dielectric of oil is about 2.00. Various sand and rock formations provide dielectric measurements of about 4.0 to about 10.0. The dielectric of water, however, can range quite high, even as high as 80.0 for relatively pure water. Any impurities in the water may lower the dielectric somewhat, but water can nevertheless be distinguished by the high dielectric.

The present apparatus and method are able to measure dielectric as a means of further distinguishig the nature of the formation encountered along the well borehole. This works even in a mixed region where the formation is made of two materials, one example being a water bearing snad. This process can be used in formations of three materials also such as oil and water in sand. The dielectric is determined by the relative percentage and respective dielectrics making up the formation. In this instance, the value is given by the relationship of $D = f_1 d^m + f_2 d^m$, where m can be a complex number. In the foregoing, the fractions $f_1 \ldots f_n$ represent the respective percentages of the materials in the formation, while the respective material dielectric values are indicated by the symbol $d_1 \ldots d_n$. For instance, if a formation is ½ fresh water and the remainder sand, the foregoing equation by itself will not provide fractions of sand and water, but other measurements providing other data enable fractions of sand and water to be mathematically isolated. The present invention is therefore very useful in locating water bearing formations and provides output data indicative of the presence of water, and coupled with other data, can even indicate the percentage fraction of water in a given formation. By estimation of water in a particular formation, other conclusions can be drawn regarding that and adjacent formations which aid and assist in well completion procedures.

The present apparatus is summarized as a microwave transmitting system supported in a sonde having a transmitter antenna which transmits through the adjacent or near formations to a receiver antenna. Microwave frequencies are used and ideal frequencies are in the range of about 30 megahertz to 30 gigahertz or more, the system including a transmitter oscillator connected with an output amplifier providing a continuous wave (CW) signal through a coupling circuit to the transmitter antenna. A portion of the output signal is applied through a mixer to beat with a signal from a local oscillator to provide a reference signal to a measuring circuit. Part of the CW signal applied to the antenna is reflected back into the transmitter circuitry. The formation scatters the transmitted signal dependent on formation electrical parameters and the scattering sends some portion of the CW signal back to the antenna. This contrasts with the absence of scattering where the transmitted signal is directed into space or air. The reflected signal is mixed with the local oscillator signal to produce a reflected signal for the measuring circuit. The received signal is obtained through the receiver antenna and is also mixed with the signal from the local oscillator to provide a signal for the measuring circuit. The measuring circuit makes three separate measurements related to the incident, reflected and transmitted signals all discussed below. These measured signals are converted into a suitable format by an A/D converter and are output for further manipulation to determine values of the dielectric. The foregoing is accomplished at selected radial depths utilizing a sonde supported pad with one or more receiver antennas thereon. Measurements are made along the borehole at a variety of depths. The sonde pad is pushed to the side of the borehole so that it is brought in intimate contact against the sidewall of the well borehole, and such measurements are analyzed as will be described. This provides data regarding the dielectric of formations and is therefore useful in further analysis of the producing formations.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 shows a sonde and pad supported dielectric measuring system in accordance with the teachings of the present disclosure wherein antennas for a transmitter and one or two receivers are positioned against the sidewall;

FIG. 2 is an equivalent circuit of certain components of the system shown in FIG. 1, and is useful for an explanation of operation of the system; and FIG. 3 is a graph of measurements for various values of dielectric, the graph being useful in description of the system.

DETAILED DESCRIPTION OF THE PREFERRED EMBODIMENT

Figure 1:
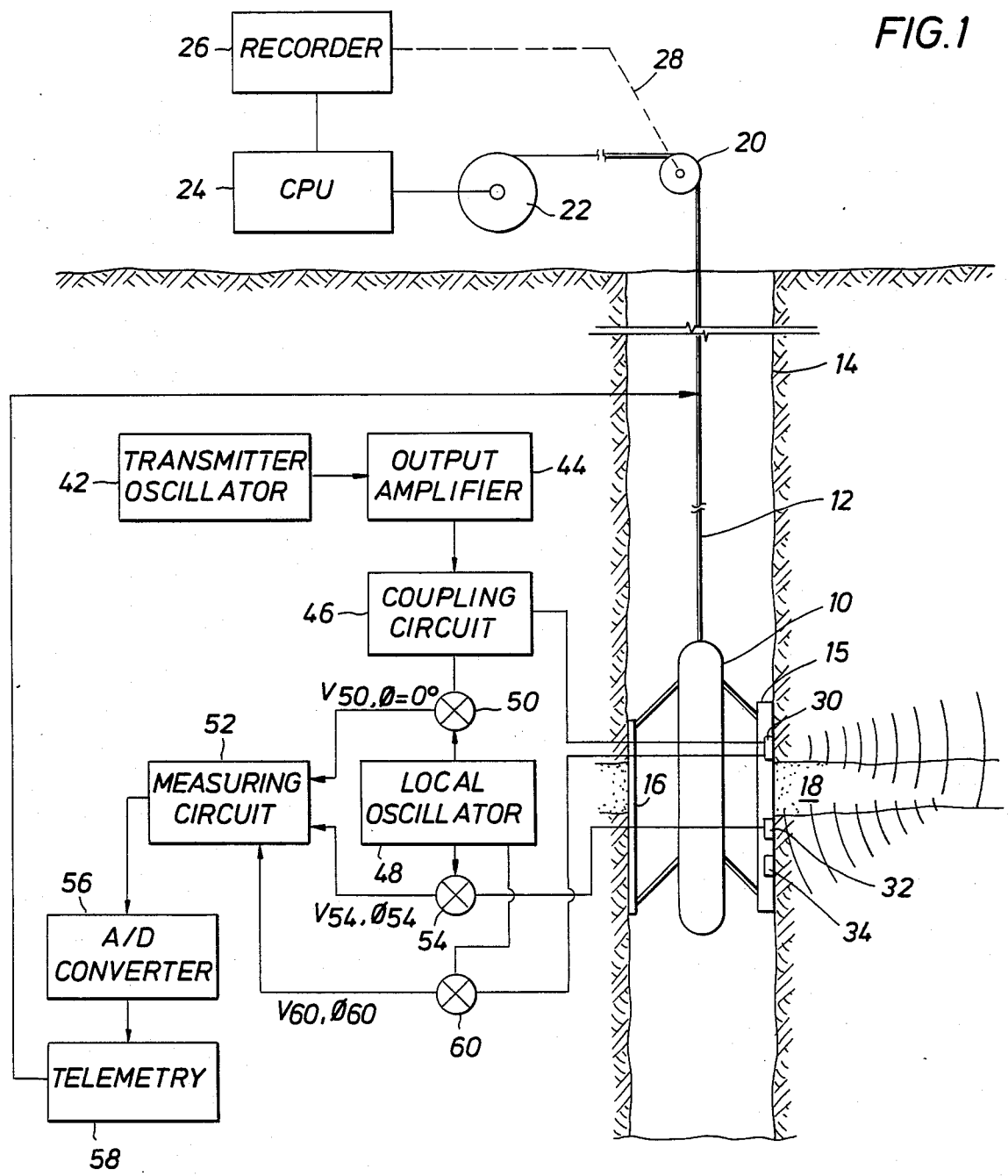

Attention is first directed to FIG. 1 of the drawings where the numeral 10 identifies a sonde supported on a logging cable 12. The sonde is a tool lowered into the well borehole 14 for making measurements against the sidewall and into the formations. To this end, a backup pad 16 is incorporated for deflecting the sonde to the side thereby enabling a sensor pad 15 on the sonde to contact the sidewall. Desired measurements are made in the formation 18 penetrated by the well borehole. Moreover, after measurements are made at the formation 18, the sonde 10 is thereafter raised on the logging cable 12 to make measurements as it traverses the borehole.

The cable 12 passes over a sheave 20 and is spooled on a drum 22. The cable is supplied in substantial length to enable a very deep well to be logged. The logging cable 12 includes one or more conductors through which important data is delivered to the surface, and the data is output from the cable to a CPU 24. The data is then output to a recorder 26 for archive purposes, the data being recorded as a function of depth in the well. Depth measurement is provided by a mechanical or electrical depth measuring apparatus 28 which provides the depth of the measurements exemplified at the formation 18.

The sensor pad 15 supports a transmitter antenna 30. It also supports a receiver antenna 32. As desired, a second receiver antenna 34 is likewise included. Two receivers can be used to provide additional benefits. However, only the receiver antenna 32 is shown connected to the attached circuitry. If desired, duplicate circuitry can be connected with the receiver antenna 34 so that an additional measurements can be obtained.

The antenna 30 transmits a high frequency microwave CW signal radiantly outwardly into the formation 18 so that characteristics of that formation can be measured. Characteristics measured in that formation include formation dielectric in accordance with the teachings of the present disclosure. The radiation is scattered with a portion of the signal received at the receiver antenna 32. The transmission path through the formation 18 encodes formation information into the received signal as described.

The remainder of the system shown in FIG. 1 should be considered. A transmitter oscillator 42 forms the CW signal to be transmitted. The CW signal is provided to an output amplifier 44 and is amplified to a suitable amplitude. The amplified signal is output through a coupling circuit 46. The circuit 46 delivers the output signal to the transmitter antenna 30 for transmission into the formation 18. A local oscillator 48 forms a CW frequency useful in beating with the CW transmitter frequency which mixing occurs in a mixer circuit 50. The mixed output is then delivered to a measuring circuit 52 which makes the necessary measurements of the difference signal and forms an output, including amplitude and phase shift. A portion (less than the whole) of the transmitter signal is reflected by the formation at the antenna 30 and that reflected portion is returned to a mixer circuit 60 for mixing with the local oscillator 48 output signal. The mixed signals are applied to the measuring circuit for amplitude and phase measurement of the difference signal. In addition, the receiver antenna 32 and the oscillator 48 are connected with a mixer circuit 54, and the beat difference in the two signals is then delivered to the measuring circuit 52.

The measuring circuit 52 provides three output signals reflecting amplitude and phase shift measurements to the A/D converter 56 which forms suitable output data in a proper format to a telemetry circuit 58. The output data of amplitude and phase shift is transferred by telemetry to the logging cable 12 which includes one or more conductor paths in it. Timing of all the apparatus of FIG. 1 is easily controlled because the transmitted and received signals are CW signals and hence are free of timing restraints. The measuring circuit 52 is switched to make all three measurements, namely, a reference value, a reflected value and a received value respectively from the mixers 50, 60 and 54. Each measurement includes amplitude and phase shift.

DISCUSSION OF SYSTEM THEORY FOR DIELECTRIC MEASUREMENTS

Figure 2:
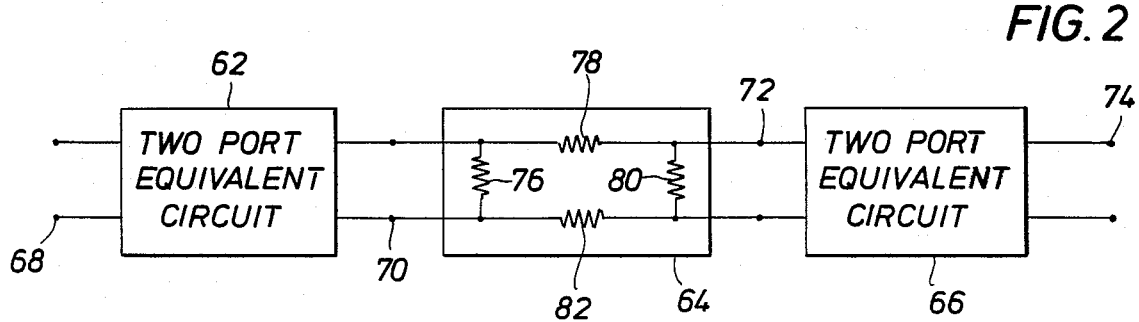

The circuitry connected from the measuring circuit 52 to the transmitter antenna 30 represents a fixed system and has an equivalent circuit configuration. The circuit is altered by the insertion of measuring apparatus. Measuring device insertion creates no particular problem because the description below sets out a measurement process assuming that the transmission line mismatch exists. The equivalent circuit is a typified two port reciprocal electrical network, and is illustrated in FIG. 2 of the drawings where the circuit is identified by the numeral 62. In like fashion, the circuitry between the measuring circuit 52 and the receiver antenna 32 has a similar two port reciprocal electrical network representation at 66. The signal transmission path between the antennas 30 and 32 is represented by the circuit 64. Again, it is a two port reciprocal electrical network. It should be kept in mind that the equivalent circuits 62 and 66 are fixed in value because they represent the signal transmission system involved in the circuitry of the sonde 10. Because circuitry is fixed, the circuits are therefore two determinable networks. That is, the networks 62 and 66 are fixed and determinable and are represented as the circuitry extending to and from the respective two antennas. The propagation pathway into the formation 18 is on the exterior of the sensor pad 15 and is variable. When the sonde is at a fixed well depth, a particular two port reciprocal network can then be devised for representation of the strata or formation 18. Since signal propagation through the strata 18 involves electromagnetic signal propagation subject both to loss and phase shift, measurements obtained at the measuring circuit 52 are sufficient to enable determination of the equivalent network 64 which is shown in FIG. 2 of the drawings. Returning to FIG. 2 of the drawings, terminal pairs are defined at 68, 70, 72 and 74. The measuring circuit 52 in FIG. 1 is connected so that measurements can be made at the terminals 68 and 74. By the use of an appropriate short and open circuit connected at and also between the antennas 30 and 32 and by the substitution of microwave signal conductors having matching impedances between the two antennas, measurements can be taken to enable determination of the parameters describing the two port reciprocal electrical networks 62 and 66.

The networks 62 and 66 have equivalent circuits which are similar to that shown at 64. Component values are described as S parameters, and all four S parameters are complex impedances at a given frequency. For instance, the network 64 is formed of four equivalent impedances, 76, 78, 80, and 82. Each is represented by real and imaginary components, describing a complex vector. If a short circuit is provided in lieu of the network 64, the values or S parameters for the networks 62 and 66 can be evaluated and then substituted. The values in the networks 62 and 66, once measured and determined, generally are unaltered with use and at a selected frequency. They are unaltered because the equipment is fixed in value.

The four S parameters in each of the networks are identified as $S_{11}$, $S_{21}$, $S_{12}$, and $S_{22}$ in the literature, one such document being a tutorial paper by the present inventor, the paper being entitled "Measurement of Core Electrical Parameters at UHF and Microwave Frequencies", SPE 9380. The symbol $S_{11}$ is the S parameter for the circuit component 76 (a complex number). As previously mentioned, the measuring circuit 52 is applied across the terminals 68 and 74. Measurements of incident and reflected signals are made at the terminals 68. These measurements basically define $S_{11}$ as the ratio of $V_{60}$ over $V_{50}$ having a phase angle $\phi_{60}$ minus $\phi_{50}$. The latter angle is defined as the reference, hence is zero, providing the $S_{11}$ vector with an amplitude of $V_{60}/V_{50}$ at a phase angle of $\phi_{60}$. The subscripts are the mixer outputs as measured by the measuring circuit 52.

Next, the parameter 80 is determined. Recall that the sonde is raised along the borehole to make repeated measurements. Thus the parameter 80 becomes the parameter 76 when the sonde moves to position the transmitter antenna where the receiver antenna is now located. In other words, the sonde is moved along the borehole during routine logging operations so that the transmitter antenna is, at one instant $t_1$ in the location of the receiver antenna, and at the next instant $t_2$, it is located as illustrated in FIG. 1. At the time $t_1$, the transmitter antenna is located at the terminals 74. Recall that the circuits 62 and 66 are already known because they are fixed values defined by the equipment. The transmitted signal through the terminals 72 can be determined in the same fashion as the prior determination, and the $S_{22}$ parameter 80 then calculated. Both $S_{11}$ and $S_{22}$ are now known.

After determination of the electrical parameters 76 and 80, the next step is determination of the values 78 and 82, or $S_{12}$ and $S_{21}$ as labeled in the SPE article. As a result of symmetry in the equivalent circuit describing the formation 18, the circuit components 78 and 82 have equal amplitudes given by the ratio $V_{54}$ over $V_{50}$. The phase angle is $\phi_{54}$ minus $\phi_{50}$, the latter angle being the reference so that the relative phase angle is $\phi_{54}$. Determination of the four equivalent circuit components is then obtained because $S_{12}$ and $S_{21}$ are equal.

The next step is to convert the four components from impedance measurements into electrical parameters describing the formation. The desired parameters are formation resistivity, magnetic permeability and dielectric constant. The SPE article discusses a process of conversion to obtain resistivity, magnetic permeability and the dielectric constant of the formation so that these values are determined for specific formations. All these parameters are useful in log interpretation.

Figure 3:
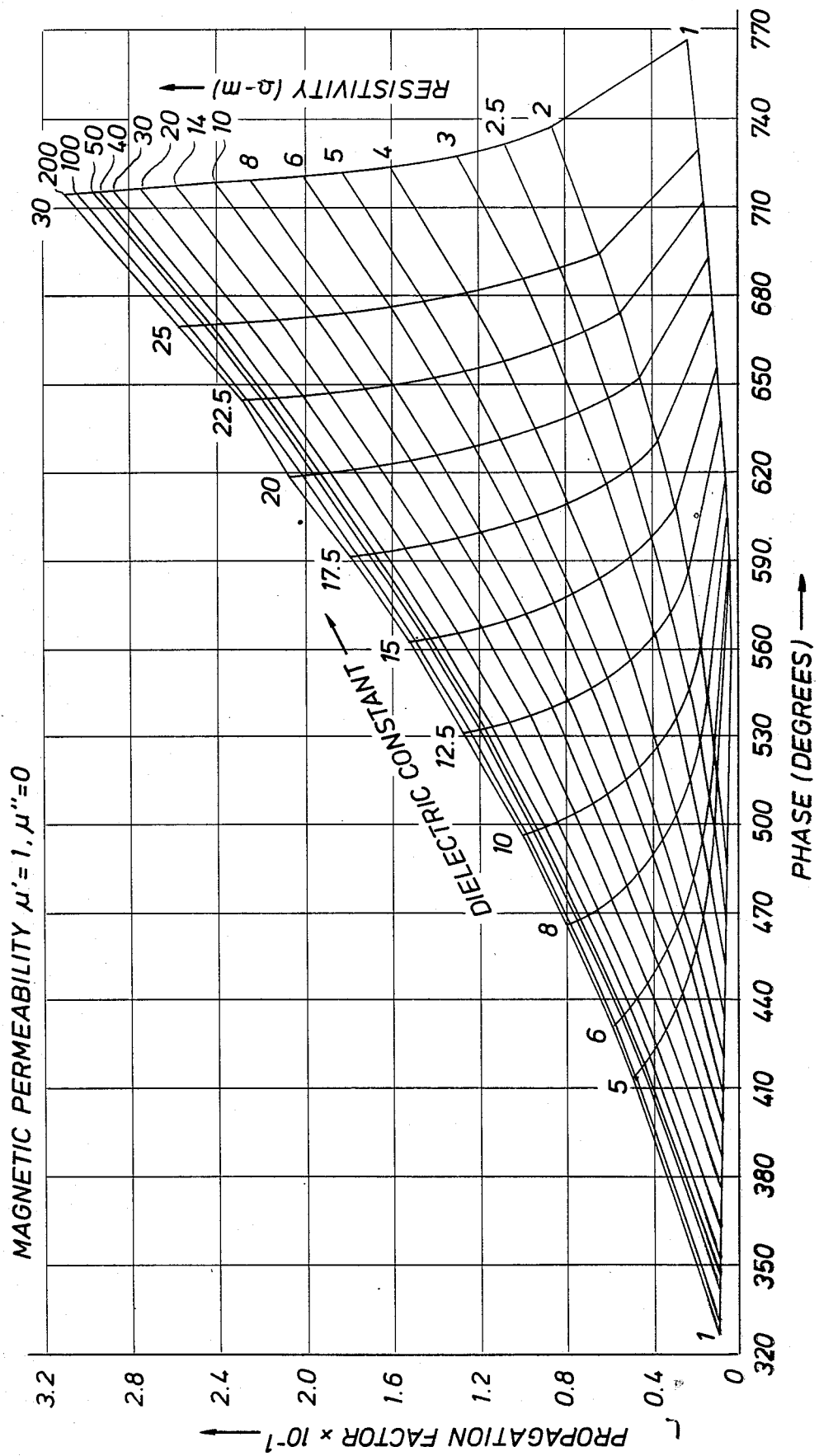

FIG. 3 of the drawings is a plot showing propagation constant for the case where magnetic permeability is equal to unity, the graph encoding dielectric constant and resistivity. These two are measurable parameters describing the formation 18 along the signal propagation path. This system enables the resistivity and dielectric to be measured in the formation 18, thereby forming an output value.

As shown in FIG. 3, measurements of S parameters (amplitude and phase) yields values of dielectric and resistivity. This results from the fact that the measurements made by the measuring circuit 52 are complex variables (meaning vectors having amplitude and phase) which readily converts into the measurement shown in FIG. 3, namely the dielectric constant and resistivity. The measuring circuit 52 provides the necessary amplitude and phase values at the terminals 68 and 74 in FIG. 2 and hence enables determination of the circuit components in the equivalent circuit 64. Dwell time of the tool at the formation 18 may appear substantially nil while the sonde is operated on the fly; however, useful data measurements are obtained at each formation of interest. From the measurements, the dielectric measurement of the materials making up the formation 18 is determined. The repeated measurements taken as the sonde 10 is raised along the well borehole 14 are used to evaluate the formation 18 and other formations along the borehole.

THE THEORY OF OPERATION

Dielectric measurements are best understood on reference to FIG. 2 of the drawings which shows a circuit provided for tutorial purposes. Tutorial help is provided by the SPE 9380 Paper. The equipment which is within the sonde has an equivalent circuit in FIG. 2 of the drawings. In accordance with conventional system operation, there is a transmitter oscillator 42 which forms a signal at a high frequency which is delivered through the output amplifier 44 and then to the coupling circuit 46. The coupling circuit 46 is a device typically incorporated between the output amplifier 44 and the antenna 30. Coupling circuits are believed to be quite old. One exemplary coupling circuit is simply an impedance matching transformer. It reflects the desired circuit load for the amplifier 44; it provides the output signal for the antenna 30. The device 52 is simply a voltmeter which measures a complex variable and one such measuring circuit is exemplified by the circuit analyzer Model 3577-A manufactured by Hewlett-Packard. Instead of simply providing a voltage, it forms an output which includes both the voltage and the phase angle. The measuring circuit is provided with three different signals to measure. Each voltage has an amplitude, and each measured variable also includes a phase angle. By use of a high frequency oscillator 42 and a local oscillator 48, the first differential is provided by mixing. As an example, assume that the oscillator forms an output signal at 1.05 gigaHertz. Assume the local oscillator has a frequency which is at 1.00 gigaHertz. The difference is 0.05 gigaHertz or 50 megahertz. It is easier to make measurements in the 50 megahertz range rather than operate in the gigaHertz range. Thus, the local oscillator provides a signal which is beat with the higher frequency signal from the oscillator 42 and the difference signal is measured at the measuring circuit 52. The local oscillator 48 thus drives three adding or mixing circuits 50, 54 and 60. The three signals are input to the measuring circuit 52. Again, all three of the measurements involve voltage amplitude and measurement of the phase angle. One signal is arbitrarily determined to be a 0° reference, and the other two have some other angle with respect to the reference. It is somewhat arbitrary but a matter of convenience to make the output signal from adding or mixing circuit 50 as the reference and to that end, it is arbitrarily assigned a phase shift of 0°. The two remaining angles are $\theta_{54}$ and $\theta_{60}$.

Three adder circuits 50, 54 and 60 are provided with input signals as discussed above and include in particular the transmitter signal (reference) through the adder 50, and the remaining two signals which are connected to the antennas on the pad 15.

As FIG. 1 depicts, the transmitter antenna 30 broadcasts an EMF wave, but it is scattered by the materials in the formation 18 and some portion is returned to the pad 15, and such scattered and returned EMF signals form inputs at the antennas 30 and 32.

FIG. 2 shows an equipment circuit. The circuits 62 and 66 are those portions of the equipment which are fixed in value. The circuit components 62 and 66 thus represent the equivalent circuits of the equipment which is in the sonde 10. The circuits 62 and 66 terminate with the antennas 30 and 32. The equivalent circuit 64 represents the unknown variable such as the formation 18. Because the circuitry connected to the two antennas is fixed, the two port equivalent circuits 62 and 66 are fixed in value for a given frequency. Only the circuit 64 includes variables. The present process measures the four components which make up the circuit 64. Once the four circuit values in the circuit 64 are known, then the next step is conversion of that data into formation parameters such as shown in FIG. 3. In general terms, this is how the present system operates. The formation 18 is represented by the circuit 64. Once the circuit values within that circuit are determined, that can be converted into measurements of resistivity and dielectric constant.

While the foregoing is directed to the preferred embodiment, the scope is determined by the claims which follow.

What is claimed is

1. For use in a well borehole for dielectric measurements of earth's formations adjacent to the borehole, an apparatus which comprises:
    (a) a sonde adapted to be lowered in a well borehole for engagement with the sidewall of the borehole;
    (b) a transmitting antenna supported by said sonde in contact with the borehole wall for transmitting microwave electromagnetic signals of a specified wave length into the adjacent formation;
    (c) a receiving antenna mounted at a distance from said transmitting antenna and supported by said sonde in contact with the borehole wall for receiving the transmitted microwave signals;
    (d) measuring means connected to said transmitting antenna and receiving antenna for making measurements of microwave electromagnetic signals transmitted through formation between said antennas and wherein the measurements include a transmitter reference signal, a transmitter reflected signal and a received signal; and
    (e) means for determining formations resistivity and dielectric constant from measurements from said measuring means.

2. The apparatus of claim 1 wherein said transmitting antenna and receiving antenna are supported on said sonde at a sensor pad.

3. The apparatus of claim 1 wherein said transmitting and receiving antennas are connected with a local oscillator forming a beat frequency signal for addition to signals from the said transmitting antenna and receiving antenna wherein the beat frequencies are provided to said measuring means.

4. The apparatus of claim 1 wherein said sonde supports means extending therefrom toward the sidewall of the well borehole for deflecting said sonde to position a sensor pad against a facing sidewall.

5. The apparatus of claim 1 including means for generating microwave electromagnetic signals at a frequency of about 30 megahertz to about three gigahertz or higher.

6. The apparatus of claim 1 including first and second receiving antennas wherein said first receiving antenna is closer to said transmitting antenna than said second receiving antenna, and said antennas receive transmitted signals from said transmitting antenna.

7. A method of measuring dielectric resistivity and magnetic permeability values of a formation along a well borehole comprising the steps of:
    (a) through a transmitter antenna, transmitting microwave electromagnetic signals from the transmitter antenna into formations adjacent to a well borehole sidewall;
    (b) receiving the transmitted signal at a receiving antenna means spaced from the transmitting antenna means;
    (c) making measurements of a transmitted reference signal and a reflected signal at the time of transmission and the received signal at the time of reception wherein said measurements comprises measurements of amplitude and relative phase angle;
    (d) determining from said measurements an equivalent two port reciprocal electrical network representative of the formation between said transmitter antenna and said receiver antenna; and
    (e) from said equivalent network, determining a value of dielectric of the formation.

8. The method of claim 7 wherein measurements are made at a measured depth along the borehole.

9. The method of claim 7 including the step of moving a sonde along the borehole while urging a sensor pad against the borehole sidewall.

10. The method of claim 7 including the steps of measuring equivalent two port reciprocal electrical networks representative of transmitting and receiving antennas.

11. The method of claim 10 wherein said antennas are connected to a measuring means for making repetitive amplitude and phase measurements.

12. The method of claim 7 including the step of determining formation resistivity.

13. The method of claim 7 including the step of determining formation magnetic permeability.

14. The method of claim 7 including the step of measuring formation parameters for the equivalent network at a first position and then a second position in the well borehole when said positions differ by the spacing between said transmitting and receiving means.

15. The method of claim 14 wherein said first and second positions differ in time along the well borehole.

16. The method of claim 7 wherein said antennas are connected to a measuring means for making repetitive amplitude and phase measurements.

17. The method of claim 7 including the step of determining formation resistivity and formation magnetic permeability.

* * * * *